United States Patent
Varcus et al.

(10) Patent No.: US 6,679,518 B2
(45) Date of Patent: Jan. 20, 2004

(54) AIRBAG MODULE FOR MOTOR VEHICLES

(75) Inventors: Johannes-Alexander Varcus, Sprockhoevel (DE); Bernd Uwe Zimmerbeutel, Remscheid (DE); Erika Helbig, Cologne (DE)

(73) Assignee: Delphi Technologies, Inc., Troy, MI (US)

( * ) Notice: Subject to any disclaimer, the term of this patent is extended or adjusted under 35 U.S.C. 154(b) by 213 days.

(21) Appl. No.: 09/866,016

(22) Filed: May 24, 2001

(65) Prior Publication Data

US 2001/0048216 A1 Dec. 6, 2001

(30) Foreign Application Priority Data

May 31, 2000 (DE) ......................................... 100 27 240

(51) Int. Cl.[7] ............................................... B60R 21/16
(52) U.S. Cl. ..................... 280/728.2; 280/731; 280/740
(58) Field of Search ............................. 280/728.2, 731, 280/740, 736; 430/349

(56) References Cited

U.S. PATENT DOCUMENTS

| | | | | | |
|---|---|---|---|---|---|
| 5,141,247 A | * | 8/1992 | Barth | ...................... | 280/728.2 |
| 5,275,431 A | * | 1/1994 | Stephens | .................. | 280/728.2 |
| 5,320,379 A | * | 6/1994 | Burnard et al. | .......... | 280/728.2 |
| 5,382,046 A | * | 1/1995 | Cuevas | ..................... | 280/728.2 |
| 5,388,858 A | * | 2/1995 | Cuevas | ..................... | 280/728.2 |
| 5,409,256 A | * | 4/1995 | Gordon et al. | ........... | 280/728.2 |
| 5,423,568 A | | 6/1995 | Zushi et al. | .............. | 280/728.2 |
| 5,577,763 A | * | 11/1996 | Cuevas | ..................... | 280/728.2 |
| 5,580,080 A | * | 12/1996 | Soderquist et al. | ...... | 280/728.2 |
| 5,762,361 A | * | 6/1998 | Herrmann et al. | ........ | 280/728.2 |
| 5,788,268 A | * | 8/1998 | Goss et al. | ............... | 280/728.2 |
| 5,788,399 A | * | 8/1998 | Smearsoll | .................... | 403/327 |
| 6,176,511 B1 | * | 1/2001 | Adkisson et al. | ......... | 280/728.2 |
| 6,368,010 B1 | * | 4/2002 | Marchini et al. | ........... | 403/348 |
| 6,439,599 B1 | * | 8/2002 | Laue et al. | .................. | 280/731 |

FOREIGN PATENT DOCUMENTS

| | | | | |
|---|---|---|---|---|
| DE | 29723033 | | 4/1998 | ........... B60R/21/20 |
| DE | PCT/DE99/02973 | * | 8/1998 | ........... B60R/21/16 |
| DE | 19731314 | | 1/1999 | ........... B60R/21/20 |
| DE | 29816923 | | 1/1999 | ........... B60R/21/20 |
| DE | 29902033 | | 5/1999 | ........... B60R/21/16 |

* cited by examiner

Primary Examiner—Lesley D. Morris
Assistant Examiner—Paul Royal, Jr.
(74) Attorney, Agent, or Firm—Scott A. McBain

(57) ABSTRACT

The invention relates to an airbag module for motor vehicles, comprising a housing for an inflatable airbag and a gas generator, with the gas generator being coupled to the housing without securing means via at least one elastic and/or oscillation damping coupling member.

16 Claims, 3 Drawing Sheets

AIRBAG MODULE FOR MOTOR VEHICLES

TECHNICAL FIELD

The invention relates to an airbag module for motor vehicles, comprising a housing for an inflatable airbag and a gas generator.

BACKGROUND OF THE INVENTION

Airbag modules of this kind serve to accommodate the airbag in the folded together state and to inflate it by means of the gas generator in the event of an accident. The airbag modules are installed in the vehicle as a unit. In this, conflicts can arise with other functional units of the motor vehicle which were previously located at the places where the airbag module is now to be provided in order to offer an ideal protection for the vehicle passenger. For example in drivers' airbags which are to be accommodated in the central region of the steering wheel an ideal capability of functioning both of the airbag system and of the horn system of the vehicle must be ensured if the latter is to be likewise provided in the central region of the steering wheel. Furthermore, problems can arise if oscillations which arise during the operation of the vehicle are transmitted to the airbag module and the airbag module is integrated into the vehicle in such a manner that further tasks are assigned to it in addition to the protective function. Not only the driving comfort, but also additional functions of this kind can be impaired through oscillations of the airbag module.

The problem (object) of the invention is to create an airbag module of the initially named kind which is constructed as simply as possible, is not impaired by arising oscillations and can be used in particular as a drivers' airbag which can be integrated into a steering wheel unit.

SUMMARY OF THE INVENTION

In accordance with the invention only the elastic and/or oscillation damping coupling member is required for coupling the gas generator to the housing. As a result of the coupling without securing means, no separate securing means such as for example screws or the like are required. Through this the attachment of the gas generator at the housing and thus the assembly of the airbag module is particularly simple.

The elastic and/or oscillation damping coupling member provides for a decoupling between the gas generator and the housing. Through this it is possible to subdivide the total mass of the airbag module substantially into the mass of the housing and of the airbag on the one hand and into the mass of the gas generator on the other hand. Through this the mass of the gas generator can fulfill an oscillation damping function in an advantageous manner. If the airbag module in accordance with the invention is integrated into a steering wheel unit, disturbing oscillations of the steering wheel can be avoided or reduced through suitable design of the coupling member. The respective masses and the respective type of coupling to the steering wheel system can be intentionally matched to additional functions which are to be transferred to the housing and/or to the gas generator in the installed state.

Through the coupling of the gas generator to the housing, the housing with the gas generator which is attached to it and thus the airbag module as a whole can be attached at a motor vehicle, for example at a steering wheel unit. Through the coupling member it is ensured that the gas generator and the housing can move independently of one another; i.e. the gas generator can execute oscillatory movements independently of the housing.

In a preferred embodiment of the invention the coupling member has a closed peripheral contour and is formed in particular in the shape of a ring. A coupling member of this kind enables a particularly simple attachment of the gas generator at the housing.

To connect the gas generator to the coupling member a particularly preferred embodiment of the invention proposes hanging in the gas generator into the coupling member.

In accordance with a particularly preferred embodiment the gas generator is connected to the coupling member in the manner of a bayonet lock. Through this a connection between the gas generator and the coupling member which is simple to manufacture and which is at the same time particularly secure is achieved.

The coupling member preferably has at least one in particular groove-like or slit-like recess at an inner side with which a holding section of the gas generator which projects preferably perpendicularly from an outer wall of the gas generator is in engagement.

To connect the coupling member to the housing it is provided in accordance with a further preferred exemplary embodiment of the invention that the housing, in particular a base plate, is pushed on onto the coupling member.

For this the coupling member preferably has at least one in particular circumferential and preferably groove-like or slit-like recess at an outer side with which a holding section of the housing is in engagement.

An edge region of the housing base which bounds a base opening which is provided for the gas generator preferably serves to connect the housing to the coupling member.

A particularly secure and nevertheless elastic and/or oscillation damping coupling between the gas generator and the housing is achieved in accordance with a further preferred embodiment of the invention in that sections of the gas generator and of the housing which are in engagement with the coupling member overlap each other in the radial direction.

The coupling member can be provided as a separate component or be formed on at the housing or moulded to the housing, in particular vulcanized on the housing, in particular a base plate of the housing.

A particularly preferred practical embodiment of the invention proposes providing the coupling member as a sealing between the gas generator and the housing. Through this the coupling member fulfills a plurality of functions at the same time in that it provides not only for an elastic and/or oscillation damping coupling of the gas generator to the housing, but also serves as a sealing. Through this it is possible in an advantageous manner to seal off the interior of the housing containing the inflatable airbag or of the airbag surrounding the gas generator respectively against the surroundings with the coupling member.

In accordance with a further preferred exemplary embodiment of the invention the coupling member is clamped in between a diffuser and a base plate of the housing, with the diffuser and the base plate preferably being screwed together. In this way the diffuser provides for a secure fixing of the coupling member and thus of the gas generator at the housing.

This fixing is of particular advantage in particular when damages, e.g. fissures, arise at the coupling member during the vehicle operation. The diffuser holds the coupling member and thus the gas generator in position, so that it is ensured that after the triggering of the gas generator the gas which is ejected from the latter reliably enters into the airbag to be inflated even if the coupling member is damaged or is torn in or torn through.

It is preferred for the diffuser to be formed as a protection against rotation for the coupling member.

In accordance with a further preferred embodiment of the invention it is provided that a diffuser surrounds the gas generator at least region-wise with spacing, with the intermediate space preferably forming a gas inlet chamber which is sealed off by the coupling member.

In this way the gas generator can execute oscillations within the diffuser uninfluenced by other components of the airbag module. In particular a contact between the oscillating gas generator and the airbag can be avoided through the diffuser.

The coupling by means of the coupling member is preferably designed in such a manner that the gas generator can be moved relative to the housing with a radial component which extends perpendicularly to a propagation direction of the airbag. The gas generator can thereby execute radial oscillations which extend perpendicularly to its longitudinal axis.

Further preferred embodiments of the invention are also set forth in the subordinate claims, the description and the drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
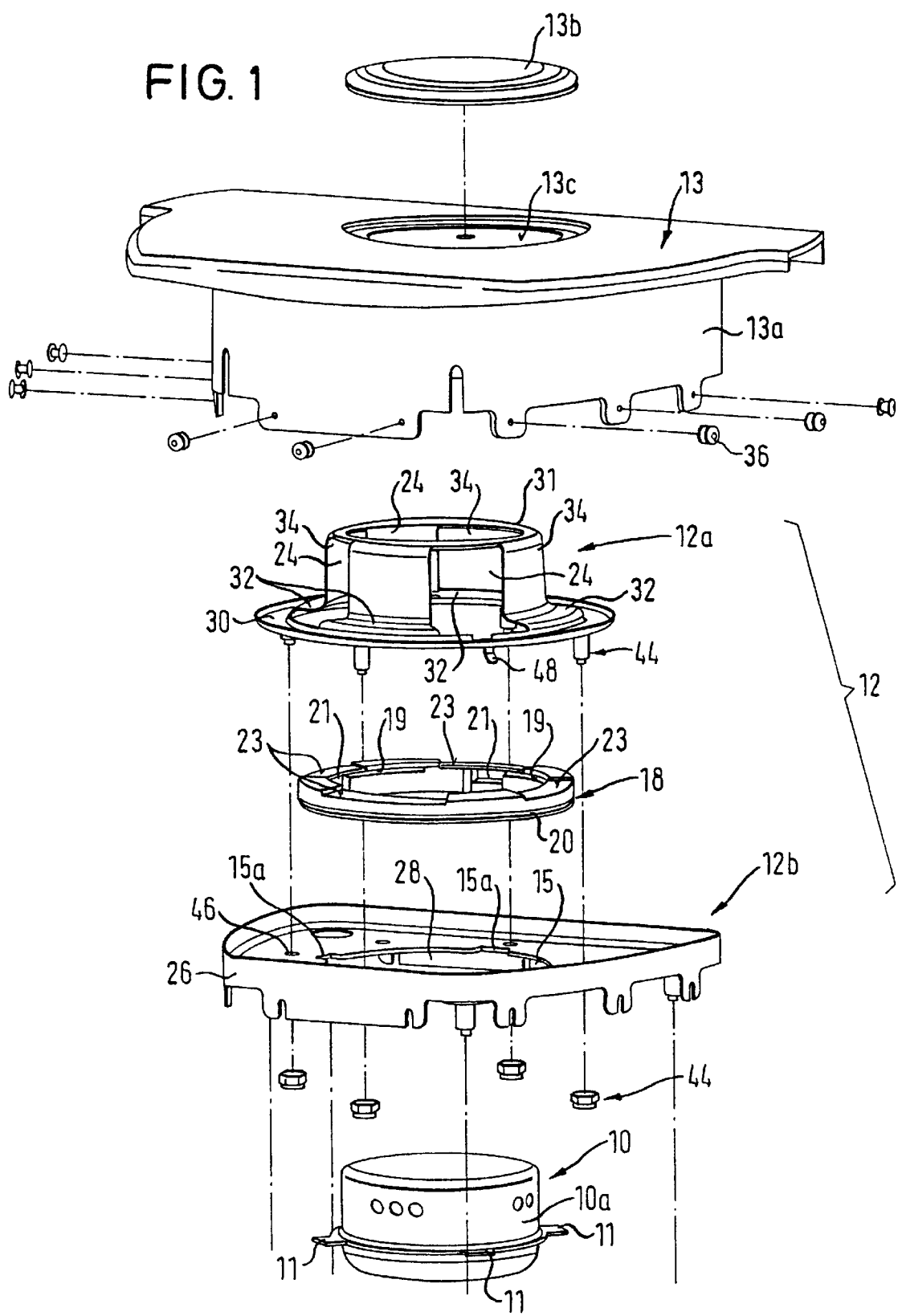
FIG. 1 is a an exploded view of an airbag module without airbag in accordance with an embodiment of the invention.

In accordance with FIG. 1 the airbag module comprises a cylindrical gas generator 10, from the outer wall of which a plurality of lug-like holding sections 11 which are distributedly arranged in the peripheral direction project perpendicularly. The holding lugs 11 are formed in a single piece at the edge of a cap 10a which is pushed over the gas generator 10 and which is firmly connected to the gas generator 10. This will be discussed in more detail elsewhere.

A housing of the airbag module comprises a cover 13 and a housing base 12 which is formed by a base plate 12b and a pan-like or hat-like diffuser 12a.

The base plate 12b is provided with a circumferential, strip-like edge section 26 which extends perpendicularly to the plane of the plate and has a circular opening 28 for the gas generator 10. An edge region 15 of the base plate 12b which bounds the opening 28 is provided with recesses 15a for the holding lugs 11 of the gas generator 10.

An annulus-shaped coupling member 18 of a flexible, elastically deformable material, for example of rubber serves for the coupling of the gas generator 10 to the base plate 12b. The coupling member 18 is formed in a single piece.

In the illustrated embodiment the coupling member 18 is a separate component. Alternatively it is also possible to provide the coupling member 18 as an integral constituent of the base plate 12b and to form or vulcanize it on respectively at its edge region 15.

At its outer side the coupling member 18 has a circumferential outer groove 20, into which the edge region 15 of the base plate 12b which bounds the opening 28 engages in the assembled state of the airbag module which will be explained in more detail in the following.

For each holding lug 11 of the gas generator 10 an inner groove 19 which extends over a limited angular region in the peripheral direction is formed at the inner side of the coupling member 18. To each inner groove 19 a recess 21 which is open downwardly in FIG. 1 and which is likewise formed at the inner side of the coupling member 18 is associated via which the respective inner groove 19 is accessible.

For the coupling of the gas generator 10 at the base plate 12b the connection of the coupling member 18 at the base plate 12b takes place first. As a result of its flexibility the coupling member 18 can be laid in into the opening 28 of the base plate 12b and be pushed on onto its edge region 15 which bounds the opening 28, and which then engages into the outer groove 20 of the coupling member 18.

For the connection of the gas generator 10 to the coupling member 18 the gas generator 10 is introduced in FIG. 1 from below into the opening 28 of the base plate 12b and in this is introduced with the holding lugs 11 through the recesses 15a of the edge region 15 and into the recesses 21 at the inner side of the coupling member 18. Then the gas generator 10 and the coupling member 18 are rotated with respect to one another, so that the holding lugs 11 enter into engagement with the inner grooves 19 of the coupling member 18.

In this way the gas generator 10 and the coupling member 18 are connected to one another in the manner of a bayonet lock.

The diffuser 12a, which can be screwed together with the base plate 12b via screw connections 44 and can be pre-fixed by means of bending lugs 48 at openings 46 of the base plate 12b, comprises a cylinder section 31, in the side wall of which a plurality of apertures 24 which are uniformly distributed in the peripheral direction are formed, and an annulus-shaped edge section 30.

Connection sections 32 between the edge section 30 and the side wall sections 34 of the cylinder section 31 cooperate in the assembled state with corresponding depressions 23 on the end side of the coupling member 18 facing the diffuser 12a. In the assembled state of the airbag module the coupling member 18 which is clamped in between the diffuser 12a and the base plate 12b is fixed together with the gas generator 10 in a manner which is secure against rotation at the base plate 12b and thus at the housing 12, 13 as a result of the connection sections 32 of the diffuser 12a which engage into the depressions 23.

The base plate 12b can be inserted together with the coupling member 18, the gas generator 10 and the diffuser 12a into the cover 13 from below in such a manner that the edge section 26 of the base plate 12b lies inwardly in contact at a side wall 13a of the cover 13. Securing elements 36 serve for the fixing of the base plate 12b to the cover 13.

An insertion element 13c, which is e.g. provided with an emblem, can be latchingly inserted into a depression 13c in the outer side of the cover 13.

Figure 2:
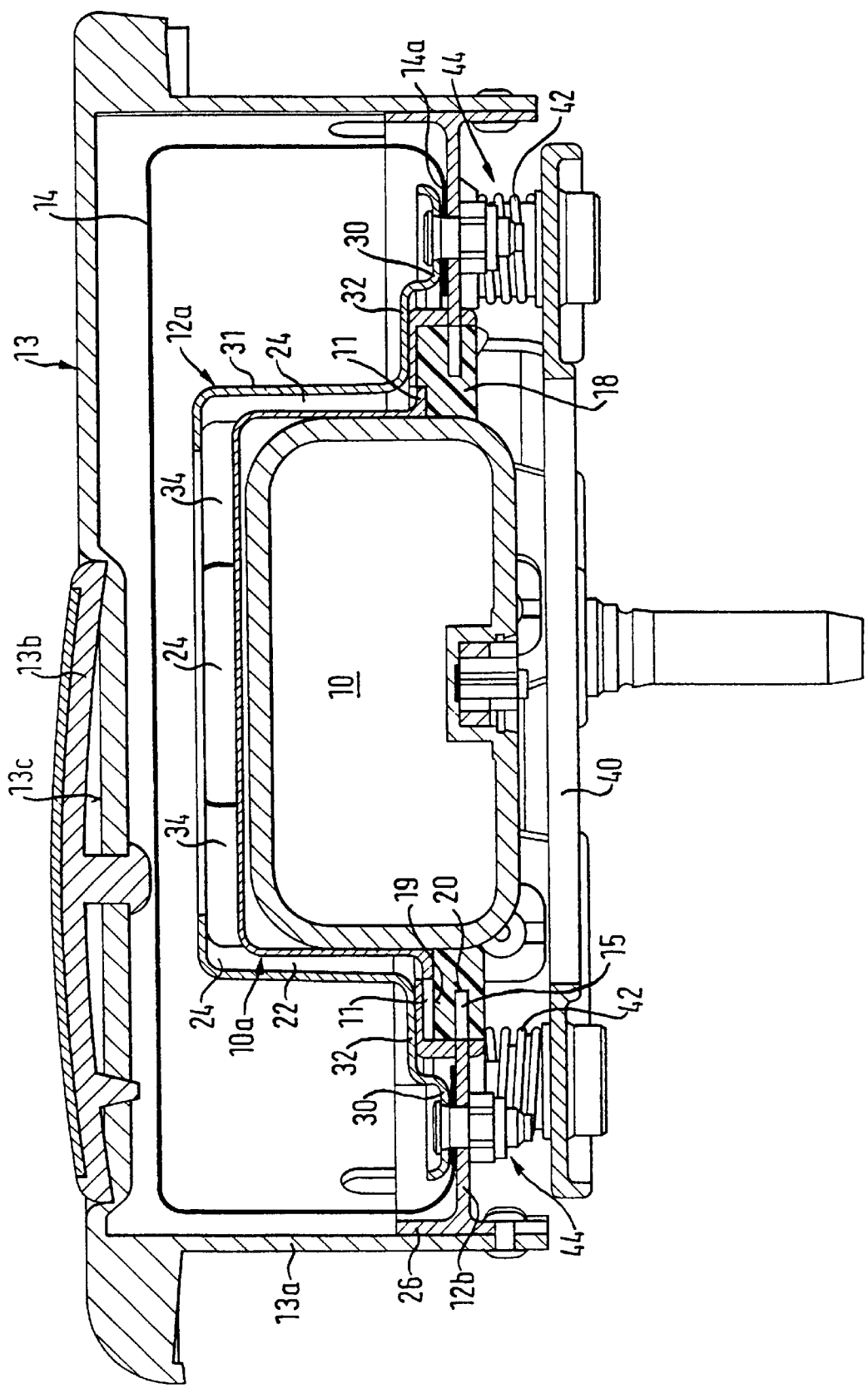
FIG. 2 is the airbag module in accordance with the invention in the assembled state in a sectioned side view.
Figure 3:
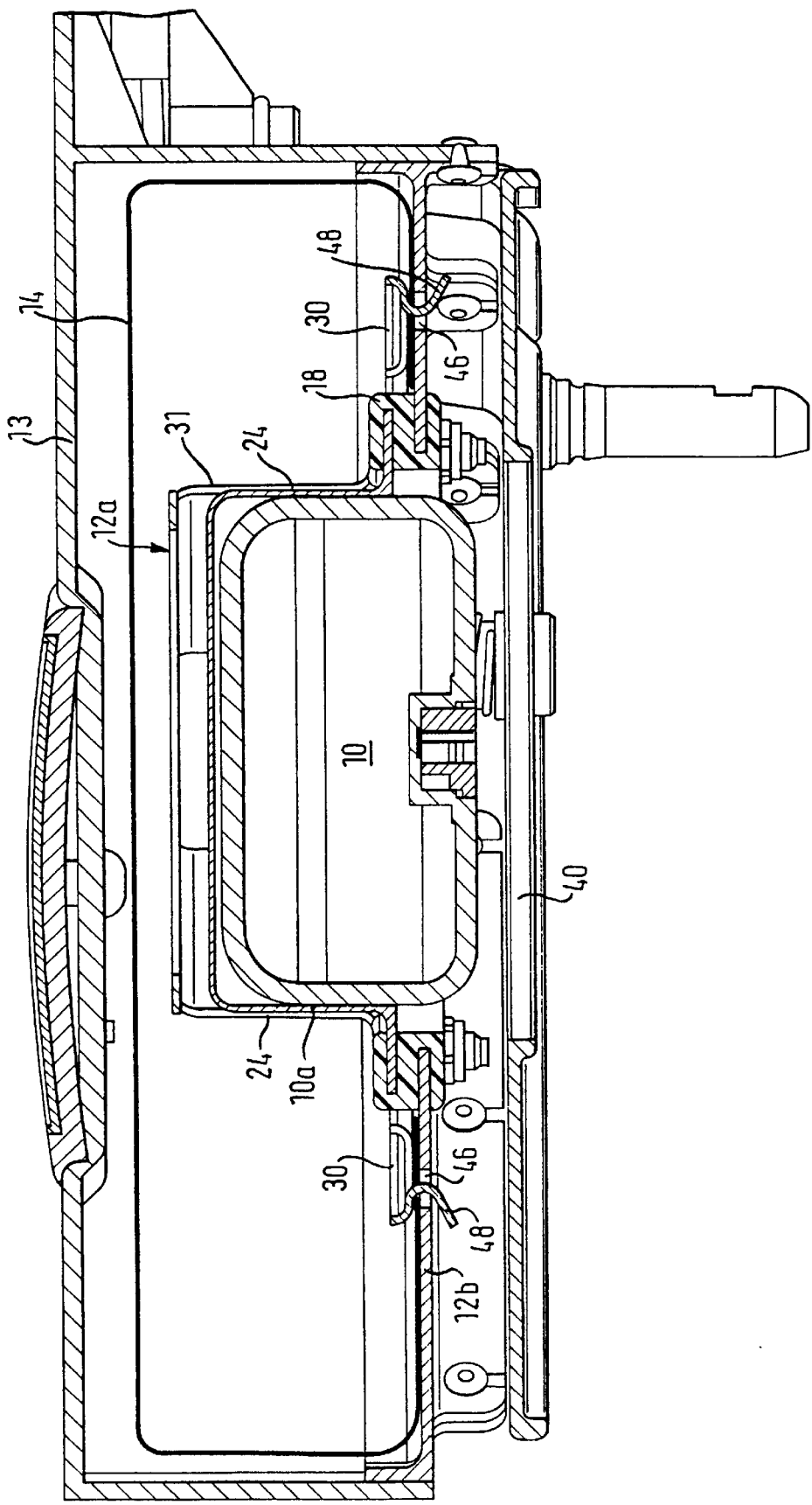
FIG. 3 is the airbag module in accordance with the invention in the assembled state in another sectioned side view.

FIGS. 2 and 3 show the airbag module in the assembled state. The airbag module is carried via the base plate 12b on a component of a steering wheel unit 40. In this the base plate 12b is supported via coil springs 42 at the steering wheel unit 40. The arrangement for carrying the base plate 12b at the steering wheel unit 40, the concrete design of which will not be discussed in further detail, is also designated as an elastic floating system or floating support respectively, in which the base plate 12b and thus the entire airbag module lies so to speak loosely upon the coil springs 42. The base plate 12b and thus the entire airbag module is therefore not rigidly connected to the steering wheel unit 40, but rather is elastically resiliently supported by means of the floating system, with it being possible for the airbag module to be moved against the restoring force of the coil springs 42 in the direction of the steering wheel unit 40.

The base plate 12b, which is connected via its edge section 26 to the side wall 13a of the cover 13, engages with its edge region 15 which bounds the opening 28 into the circumferential outer groove 20 of the coupling member 18. The holding lugs 11 of the gas generator 10 are located in the inner grooves 19 of the coupling member 18 which are formed above the outer groove 20 in FIGS. 2 and 3. In FIGS. 2 and 3 it can be seen that the edge region 15 of the base plate 12b and the holding lugs 11 of the gas generator 10 overlap in the radial direction.

In addition FIGS. 2 and 3 show that the holding lugs 11 are formed in a single piece with the cap 10a, which region-wise surrounds the gas generator 10. The gas generator 10 is firmly connected to the cap 10a in such a manner that the gas generator 10 and the cap 10a can be moved as a unit.

Illustrated in the sectional plane in accordance with FIG. 2 are the connection sections 32 which engage into the depressions 23 (cf. FIG. 1) on the end side of the coupling member 18 facing the diffuser 12a. The coupling member 18 is clamped in between the connection sections 32 of the diffuser 12a, which is screwed together with the base plate 12b via its edge section 30, and the edge region 15 of the base plate 12b.

The airbag 14 is clamped in with its edge region 14a which bounds the mouthpiece between the edge section 30 of the diffuser 12 and the base plate 12b. The application of the clamping force takes place through the mentioned screw connections 44, with which the diffuser 12a and the base plate 12b are held together. In this way a gas tight anchoring of the airbag 14 takes place at the housing base 12 which is formed by the diffuser 12a and the base plate 12b.

The cylinder section 31 of the diffuser 12a surrounds the unit consisting of the gas generator 10 and the cap 10a with spacing, so that a gas inlet chamber 22 is present between the cylinder section 31 and the gas generator 10. When the gas generator 10 is triggered the gas which is expelled by the latter first flows into the gas inlet chamber 22 before it enters via the apertures 24 between the side wall sections 34 of the cylinder section 31 of the diffuser 12a into the airbag 14.

The gas inlet chamber 22 is sealed off downwardly by the coupling member 18, which lies sealingly in contact with its inner side at a side wall region of the gas generator 10 which lies outside the cap 10a and thus completely fills out the radial intermediate space between the gas generator 10 and the edge region 15 of the base plate 12b.

In FIG. 3 the sectional plane extends through two apertures 24 of the cylinder section 31 of the diffuser 12a and through two regions of the end side of the coupling member 18 facing the diffuser 12a which separate the depressions 23 (cf. FIG. 1).

FIG. 3 also shows the bending lugs 48 which protrude through the openings 46 in the base plate 12b, which are radially bent outwardly and which are formed at the edge section 30 of the diffuser 12a. The bending lugs 48 permit a pre-fixing of the diffuser 12a at the base plate 12b before the production of the screw connections 44 (cf. FIGS. 1 and 2).

What is claimed is:

1. Airbag module for motor vehicles, comprising a housing for an inflatable airbag and a gas generator, with the gas generator being coupled to the housing without screws via at least one oscillation damping coupling member, wherein the coupling member is clamped in between a diffuser and a base plate of the housing, and wherein the base plate and diffuser are secured together by at least one fastener.

2. Airbag module in accordance with claim 1, wherein the coupling member is elastic.

3. Airbag module in accordance with claim 1, wherein the coupling member has a closed peripheral contour and is formed in the shape of a ring.

4. Airbag module in accordance with claim 1, wherein the gas generator is hung in into the coupling member.

5. Airbag module in accordance with claim 1, wherein the gas generator is connected to the coupling member in the manner of a bayonet lock.

6. Airbag module in accordance with claim 1, wherein the coupling member has at an inner side at lest one recess by means of which a holding section of the gas generator which projects perpendicularly from an outer wall of the gas generator is in engagement.

7. Airbag module in accordance with claim 1, wherein the housing has a base plate and wherein the base plate is pushed en-onto the coupling member.

8. Airbag module in accordance with claim 1, wherein the housing includes a base plate and the coupling member has at an outer side at least one circumferential outer groove with which an edge region of the base plate is in engagement.

9. Airbag module in accordance with claim 1, wherein the coupling member is connected in a sealing manner to an edge region of a base plate of the housing base, the base plate having a base opening which is provided for the gas generator.

10. Airbag module in accordance with claim 1, wherein the gas generator and the housing are in engagement with the coupling member and at least partially overlap in the radial direction.

11. Airbag module in accordance with claim 1, wherein the coupling member acts as a seal between the gas generator and the housing.

12. Airbag module in accordance wit claim 1, wherein the coupling member is laid sealingly around the gas generator.

13. A Airbag module in accordance with claim 1, wherein the diffuser surrounds the gas generator at least region-wise with spacing, with the intermediate space forming a gas inlet chamber which is sealed off by the coupling member.

14. Airbag module in accordance with claim 1, wherein the coupling member is provided as a separate component.

15. Airbag module in accordance with claim 1, wherein a the diffuser forms an inwardly vaulted region of the housing and is formed in the shape of one of a pan or hat.

16. Airbag module in accordance with claim 1, wherein the coupling by means of the coupling member is designed in such a manner that the gas generator can be moved relative to the housing with a radial component which extends perpendicularly to a propagation direction of the airbag.

* * * * *